United States Patent [19]

Lenoir et al.

[11] Patent Number: 5,267,251
[45] Date of Patent: Nov. 30, 1993

[54] LINE INTERFACE FOR A DATA TRANSMISSION NETWORK

[75] Inventors: Dominique Lenoir, Meudon la Foret; Jean-Michel Remaud, Clichy, both of France

[73] Assignee: Regie Nationale des Usines Renault S.A., Boulogne-Billancourt, France

[21] Appl. No.: 611,696

[22] Filed: Nov. 13, 1990

[30] Foreign Application Priority Data

Nov. 10, 1989 [FR] France .................................. 89 14770

[51] Int. Cl.$^5$ ...................... H04L 25/02; H04L 12/40
[52] U.S. Cl. .................. 371/57.2; 371/29.5; 371/62
[58] Field of Search ........................ 324/539, 541, 509; 371/55, 57.1, 57.2, 61, 62, 63, 29.5, 20.1

[56] References Cited

U.S. PATENT DOCUMENTS

| | | | |
|---|---|---|---|
| 4,545,055 | 10/1985 | Patel | 371/55 |
| 4,551,671 | 11/1985 | Annunziata et al. | 324/539 |
| 4,782,300 | 11/1988 | Bonaccio et al. | 324/509 |

FOREIGN PATENT DOCUMENTS 0329514 8/1989 European Pat. Off.
3342763 6/1985 Fed. Rep. of Germany.

*Primary Examiner*—Stephen M. Baker
*Attorney, Agent, or Firm*—Oblon, Spivak, McClelland, Maier & Neustadt

[57] ABSTRACT

A line interface for a two wire bus for detecting defects of the bus. The interface includes a shaping circuit having three comparators. The first comparator having two inputs connected to the two wires of the bus, the second comparator having a first input connected to one of the bus wires and another input connected to a reference signal, and the third comparator having a first input connected to the other wire of the bus and the second input connected to a reference signal. A first counter is connected to the output of the first comparator and counts a number of transitions which occur on the bus during a predetermined period of time. If the number of transitions detected by the first comparator is counted to be less than a predetermined number of transitions, the bus is defective. The second and third counters are respectively connected to the second and third comparators. Each of the second and third counters have inputs connected to outputs of the respective comparators and count the number of transitions on the output of the respective comparators. Each time there is a transition on the output of the second or third comparator, the third or second counter is reset. The comparators and counters are connected to circuitry which analyzes signals from the comparators and counters to determine defects on the bus and allow the transmission of data on only one of the bus wires if the other is defective.

10 Claims, 8 Drawing Sheets

LINE INTERFACE FOR A DATA TRANSMISSION NETWORK

BACKGROUND OF THE INVENTION

1. Field of the Invention

This invention relates to a line interface for a data transmission network comprising a filter receiving at the input the signals of the two-wire bus of the network and providing a filtered signal to a shaping circuit delivering the digitized signal to a protocol manager.

2. Discussion of the Background

Digital networks for data transfer with random access and detection of nondestructive collisions, intended for motor vehicles, are known. The bus for transmission of data is of the two-wire type. The binary states are represented on the bus by a differential voltage between the two wires, the direction of the polarity coding the value of the binary state.

Each subsystem or station having to communicate is connected to the network bus thanks to a line interface circuit. This line interface has as its function to assure the connection between the bus of the network consisting of two wires and a protocol manager joined to the station. It produces, further, the shaping of the logic signals coming from the protocol manager in a form compatible with the bus (analog signals).

Patent FR-2,627,036 describes an interface connecting a station to the two-wire bus.

SUMMARY OF THE INVENTION

This invention has as its object to provide an interface which makes possible, on the one hand, the automatic passage in a degraded mode, i.e., in communication on a single wire of the bus, in case of a defect on the bus due to a short circuit or to an open circuit and, on the other hand, the return to the normal mode (communication between the two wires) when the defect disappears. This device can locate the defects on one of the wires of the bus or on both but without recognizing its nature (grounded short circuit, to + of the supply, between the wires, open circuit, accumulation of several defects).

According to the invention, the interface comprises a filter receiving at the input the signals of the two-wire bus and providing a filtered signal to a shaping circuit comprising three comparators. The first comparator receives both filtered signals. The second comparator receives the filtered signal from one wire and a reference voltage. The third comparator receives the filtered signal from the other wire and a reference voltage, the present invention is characterized by the fact that it comprises counters to which are applied the output signals of the second and third comparators. The counters connected to the second and third comparators are reset by the input signal of the other counters to detect on an output of a number of transitions exceeding a predetermined number while the other output does not count down. There is another counter to which is applied the signal of the first comparator to count down a predetermined number of transitions of said signal during a period of time and to provide a defect signal if the number is less than this predetermined number and electronic circuits to trigger a change of state of the mode signal intended for the protocol manager, if a defect signal is detected.

According to a characteristic of the invention, the interface comprises a digital filter at the output of each of the second and third comparators, this digital filter providing a filtered signal to the second or third counter.

According to another characteristic of the invention, the signals of the counters joined to the second and third comparators are sent to storage flip-flops.

According to another characteristic of the invention, the output signals of the storage flip-flops are sent to a defect identification circuit comprising "NOR" circuits.

According to another characteristic of the invention, each digital filter consists of flip-flops, an AND gate and a NOR gate controlling the inputs of the last flip-flop.

According to another characteristic of the invention, the counter joined to the first comparator comprises a flip-flop storing the passage of a predetermined number of transitions of the exiting signal of the comparator, the reinitialization being made periodically by a signal coming from a clock circuit.

BRIEF DESCRIPTION OF THE DRAWINGS

The invention will now be described with more details with reference to an embodiment given by way of example and represented by the accompanying drawings in which.

DESCRIPTION OF THE PREFERRED EMBODIMENTS

Figure 1:
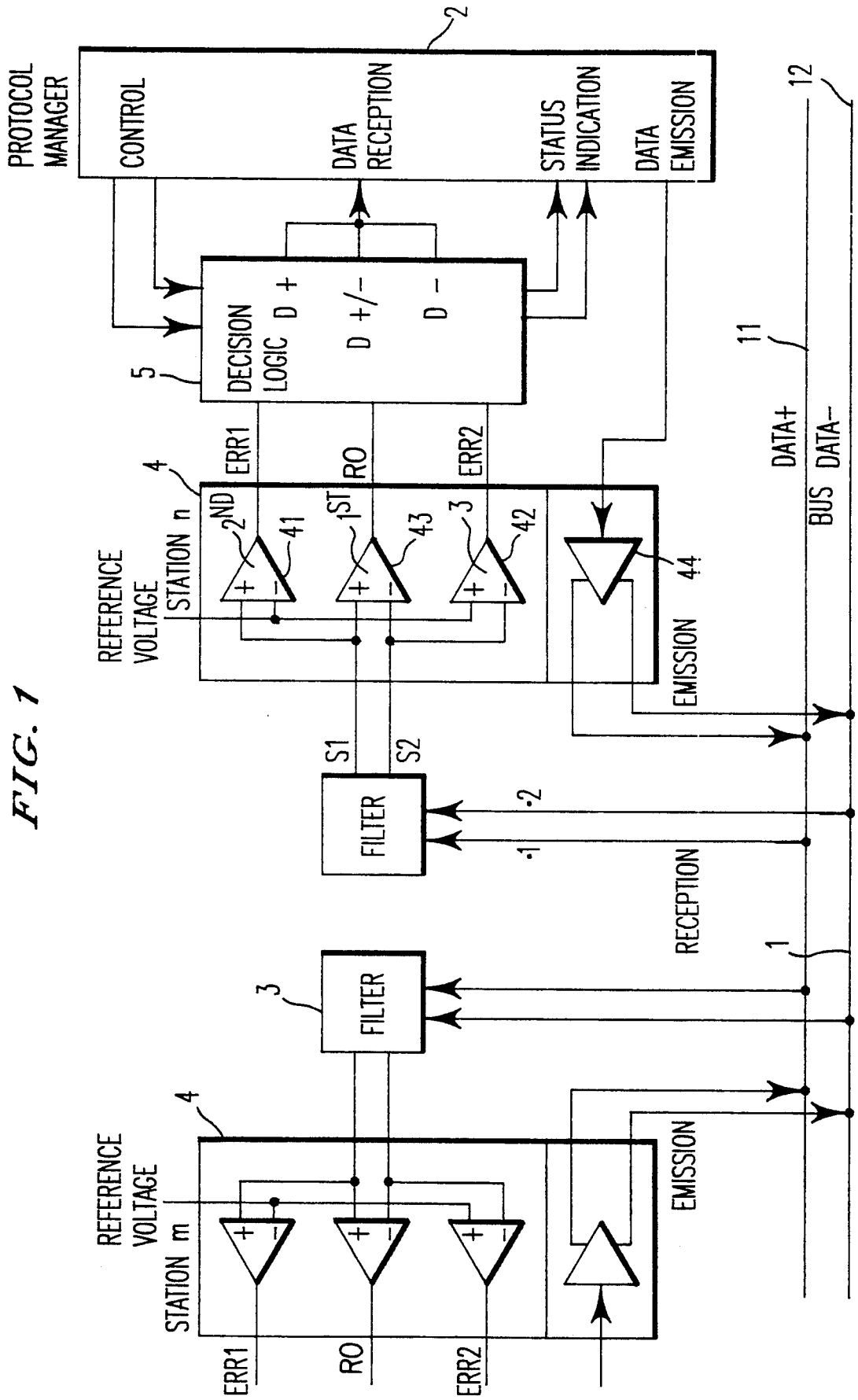
FIG. 1 is a block diagram of the line interface according to the invention.

The line interface represented in the drawings has as its function to assure the electric connection between bus 1 of the network and protocol manager 2 joined to a communication station as illustrated in FIG. 1.

Bus 1 is of the two-wire type and comprises two wires 11 and 12 (DATA+, DATA−). The binary states are materialized on the bus by a differential voltage between the two wires, the direction of polarity coding the value of the binary state.

The interface comprises an analog filter 3 whose two inputs $e_1$ and $e_2$ are connected to the wires of the bus and whose two outputs $s_1$ and $s_2$ are connected to a shaping circuit 4 (oblique). In emission, circuit 4 transforms the logic signals coming from the protocol manager into analog signals suitable for the bus. In reception, circuit 4 performs the opposite operation.

Outputs $s_1$ and $s_2$ of filter 3 are connected to a first comparator 43 whose output Ro is connected to a decision circuit 5.

Output $s_1$ of filter 3 is connected to a second comparator 41 whose other input is connected to a reference voltage. Output ERR1 of this comparator 41 is connected to decision circuit 5.

Output $s_2$ of the filter is connected to a third comparator 42 whose other input is connected to the reference voltage. Output ERR2 of this comparator 42 is connected to decision circuit 5.

Circuit 44 receives the signals from protocol manager 2 and sends them directly, after shaping, to the wires of the bus.

Decision circuit 5 continuously analyzes the output state of the three comparators to deduce from it the functioning state (normal mode or degraded mode) and to indicate the state to network manager 2.

The exiting signals of comparators 41 and 42 are processed by digital filters 61 and 62 respectively.

Figure 6:
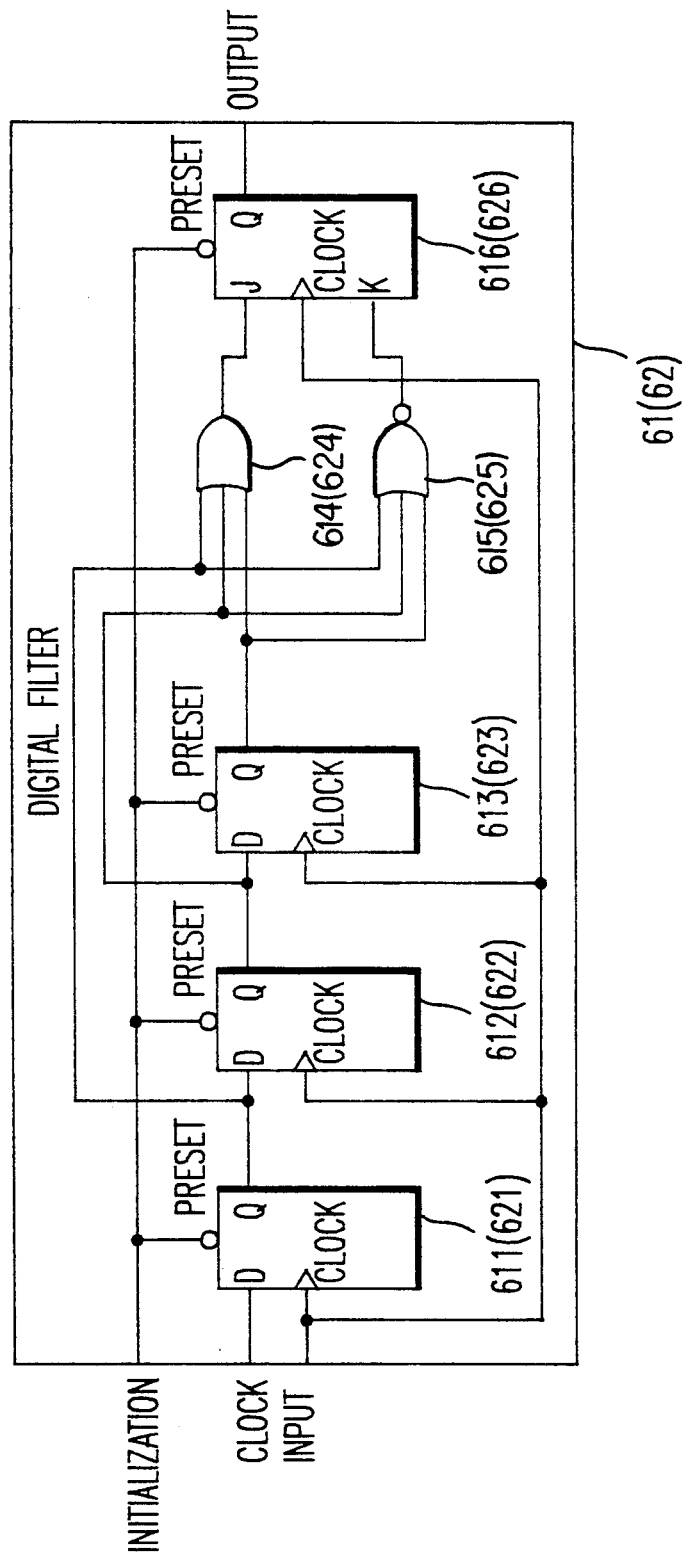
FIG. 6 is a diagram of a digital filter of the interface.

These filters 61 and 62 are identical to each other and are represented in detail in FIG. 6. They consist of 3 D flip-flops 611 to 613 (or 621 to 623) mounted in a shift register and a JK flip-flop 616 (or 626). The inputs of this flip-flop receive the signals of two AND and NOR gates each decoding the output signals of flip-flops 611 to 613. The signal of a clock 63 is applied to the clock inputs of the flip-flops.

The principle of these filters is based on the sampling of the signal coming from comparator 43 or 42. The signal is injected in the first flip-flop 611 whose output signal is sent to the next flip-flop. The three last samples in the output of three flip-flops 611 to 613 are decoded by "AND" gate 614 and a "NOR" gate 615 which respectively control inputs J and K of the last flip-flop 616. A switching on the output of the comparator is taken into account only if it is found on three successive samples. This switching is reflected by a change of state in the output of flip-flop 616.

The sampling frequency is regulated so that there are at least three samples per bit in taking into account clock drifts. The initialization of the sampler is carried out to obtain at the output a logic level corresponding to a recessive state (absence of communication on the bus).

Because of the vibrations in vehicles, it is very probable that the defects are presented in the form of false contacts, which will be reflected by brief appearances or disappearances of the defect. In spite of the analog filtering on the bus, these transitory phenomena produce parasitic pulses on the output of the comparators.

If several parasitic pulses occur during the period of a bit, the diagnosis of a defective wire can erroneously be made Digital filters 61 and 62 prevent these errors.

The signals at the output of filters 61 and 62 are sent to counters 71 and 72 respectively.

Figure 3:
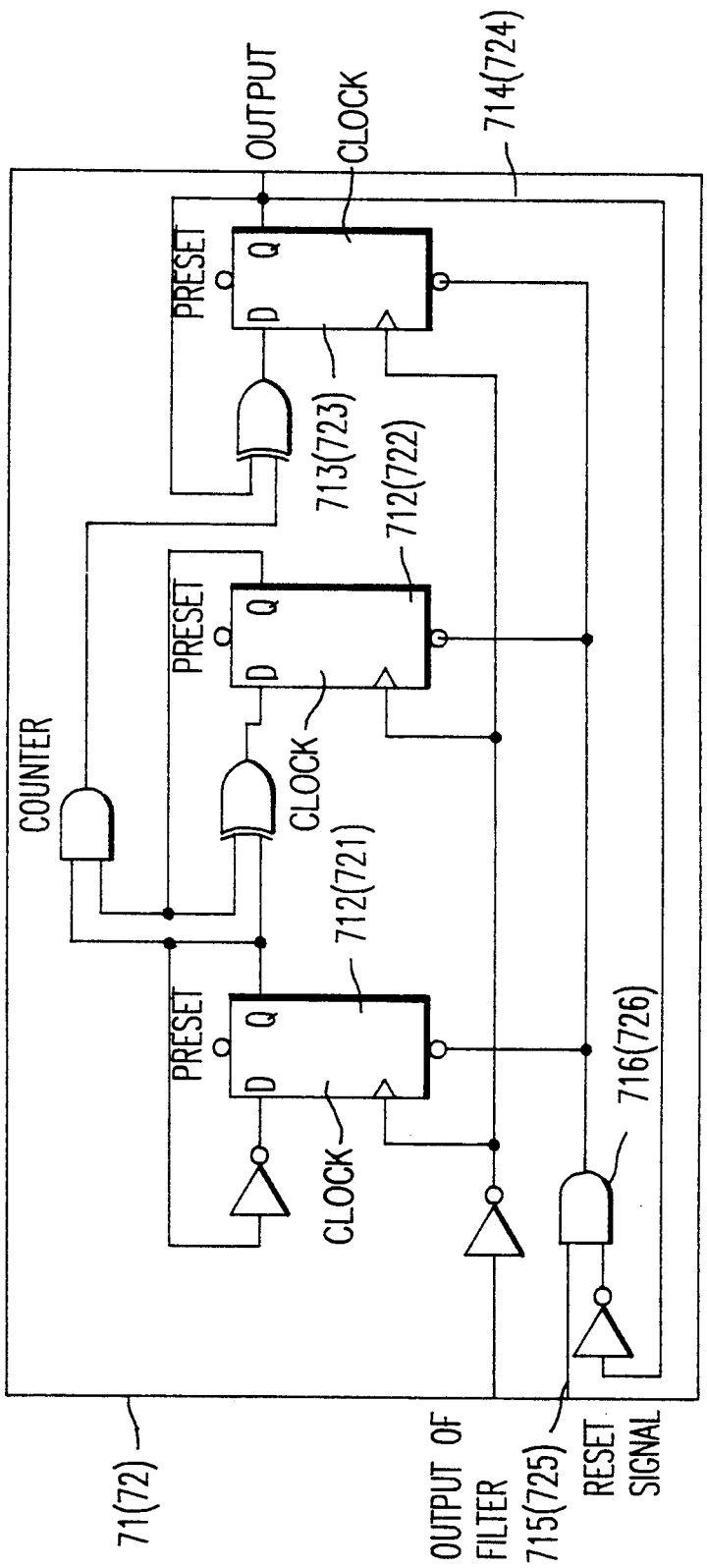
FIG. 3 is a diagram of a counter of the interface.

These identical counters are represented in FIG. 3. Each counter 71 or 72 consists of three D flip-flops 711, 712, 713 receiving on the "Clock" input the output signal of filter 61 or 62.

Counter 71 is reset on its input 715 by a reset circuit 73 activated by the input signal arriving on other counter 72. Likewise, counter 72 is reset on its input 725 by a reset circuit 74 activated by the input signal arriving on other counter 71.

Figure 7:
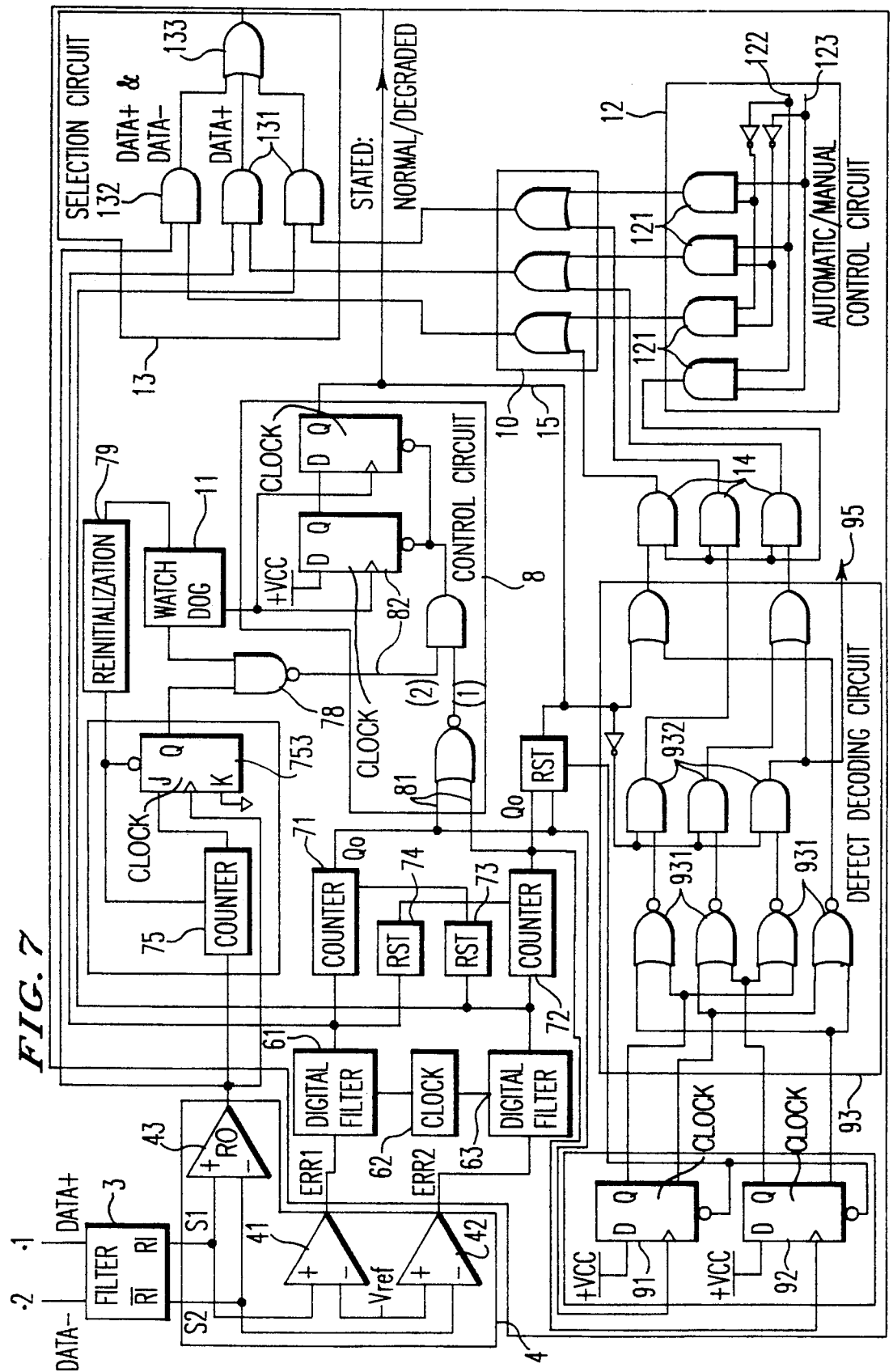
FIG. 7 is a wiring diagram of the interface on a macrocomponent.
Figure 8:
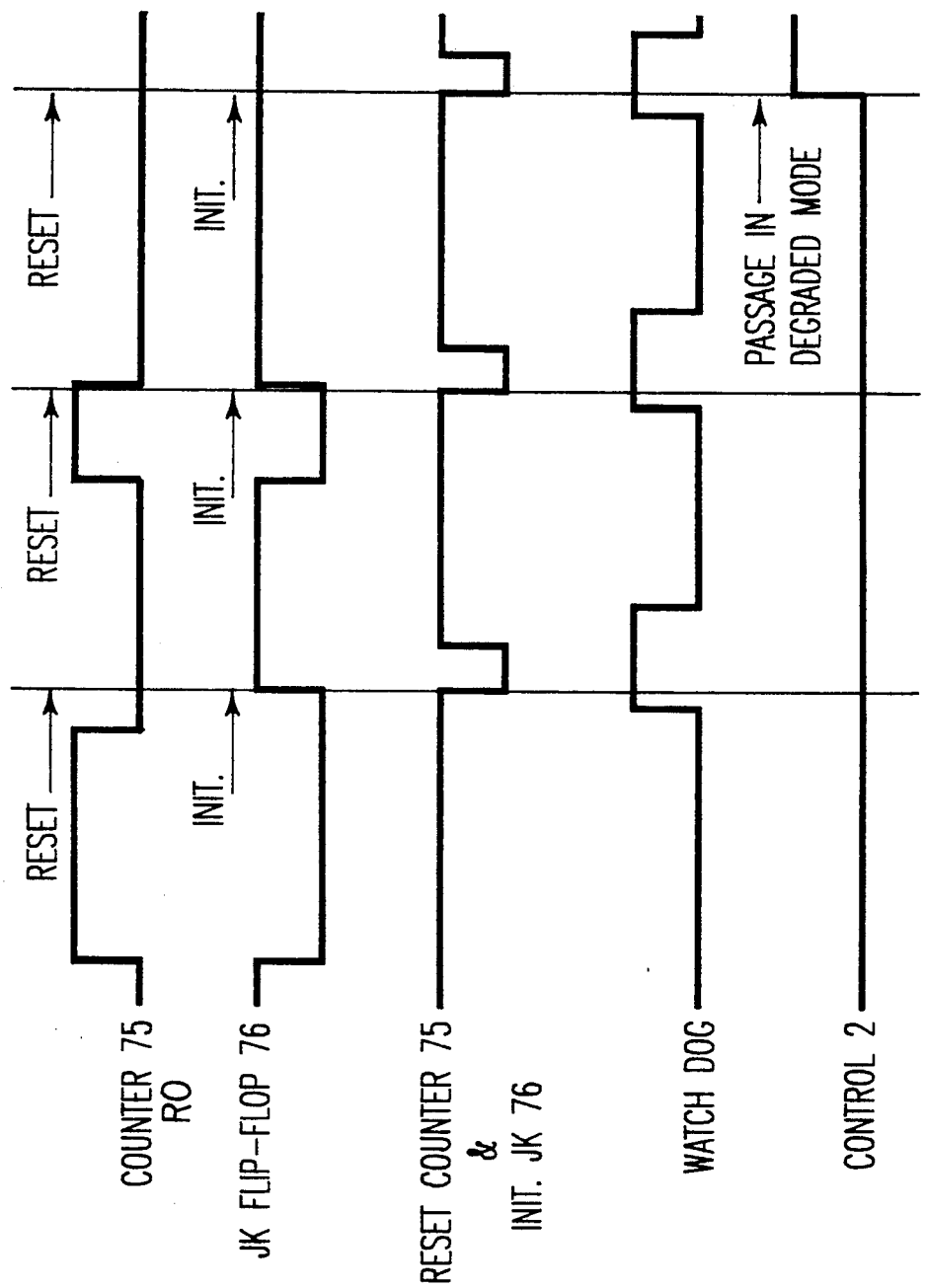
FIG. 8 is a timing diagram illustrating the operation.

In case of defects on a single wire of bus 1, one of counters 71 or 72 reaches a maximum value (4, by way of example). The overflow pulse will immediately trigger, by inputs 81, control circuit 8 comprising flip-flops 83 and 82 assuring the switching in degraded mode by a level 0, as illustrated in FIG. 7. Circuit 8 receives counter outputs 71 and 72 or the output of flip-flop 753.

Each counter 71 or 72 is of the synchronous type and operates on the trailing edge of the clock.

The output of counter 71 (or 72), as illustrated in FIG. 3, is retrocoupled by 714 (or 724) and an AND gate 716 (or 726), in resetting the unit of flip-flops 711 to 713 (or 721 to 723), which makes it possible to limit the counting to the desired value (4) with generation of a pulse which is used for the control of storage of the defect.

The detection of defects is carried out with counters 71 and 72, by continuous analysis of the state of outputs of these counters.

It is possible to classify the defects as a function of the state of counters 71 and 72. This state will be stored, then the classification of the defect will be recognized.

Figure 2:
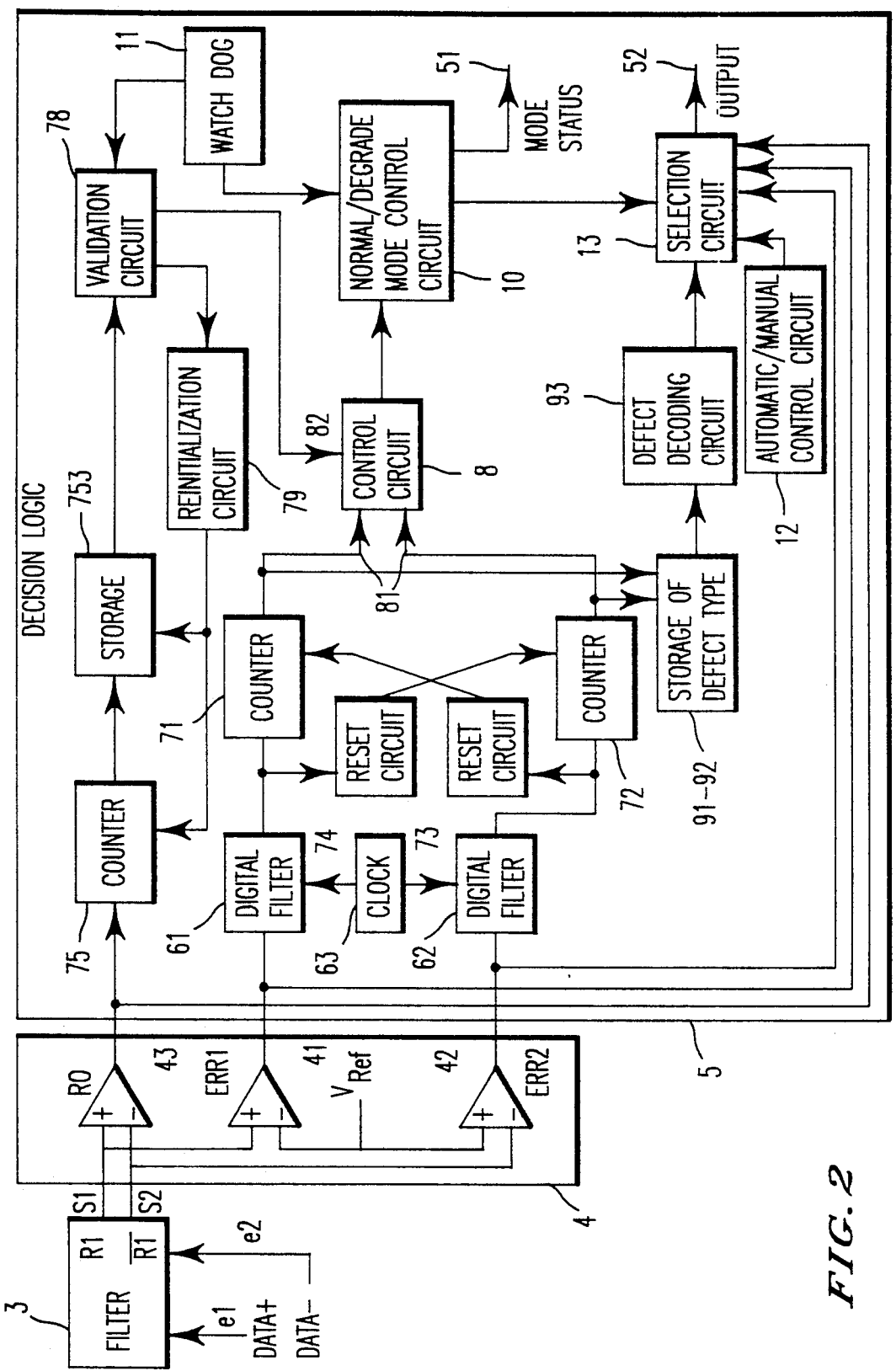
FIG. 2 is a flow chart of the interface.

When one of counters 71 or 72 reaches a maximum value (4, for example), the overflow pulse forces to 1 the output of a storage flip-flop 91 or 92 illustrated in FIGS. 2 and 7. While the defect is present, this output remains at 1. The transition 0-1 in the output of the circuit controls by 13 a reset circuit 75 which resets the flip-flops during the degraded mode to nominal mode passage, i.e. in the second pulse of clock circuit 11 called "watchdog," after the disappearance of the defect.

Figure 5:
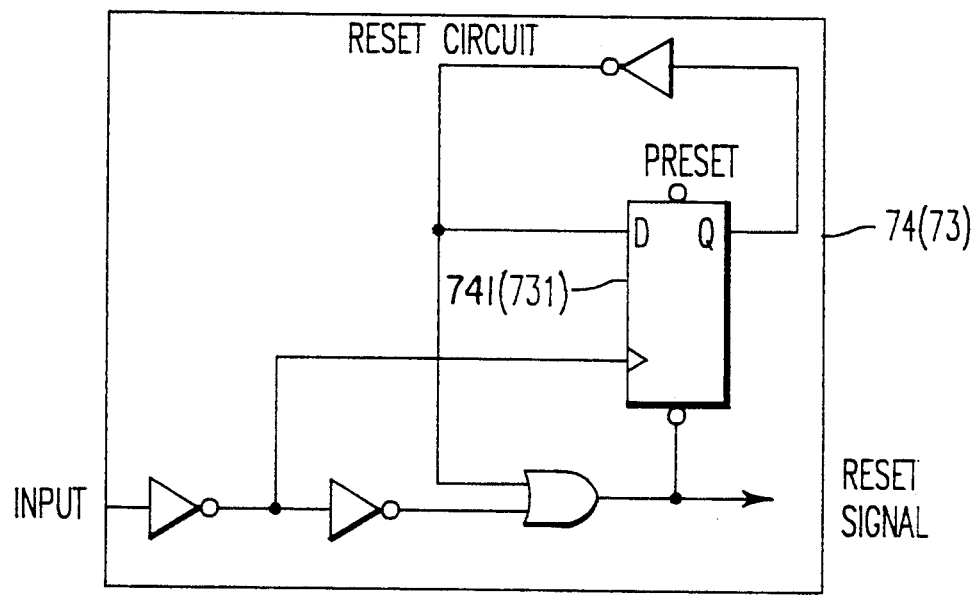
FIG. 5 is a diagram of a reset circuit of the interface.

For reasons of integration, the resetting of the counters is achieved, not with a resistance-conductor network (creation of a delay) but with reset circuit 73 or 74 illustrated in detail in FIG. 5.

The input of reset circuit 73 or 74 is driven by the filtered output of a comparator 41 or 42. Each trailing edge causes the activation of the reset signal.

This circuit 73 or 74 makes it possible to obtain a pulse of sufficient duration for the reset signal because it is defined by the necessary holding time on the "Erasure" or "clear" input of D flip-flop 731 or 741.

Figure 4:
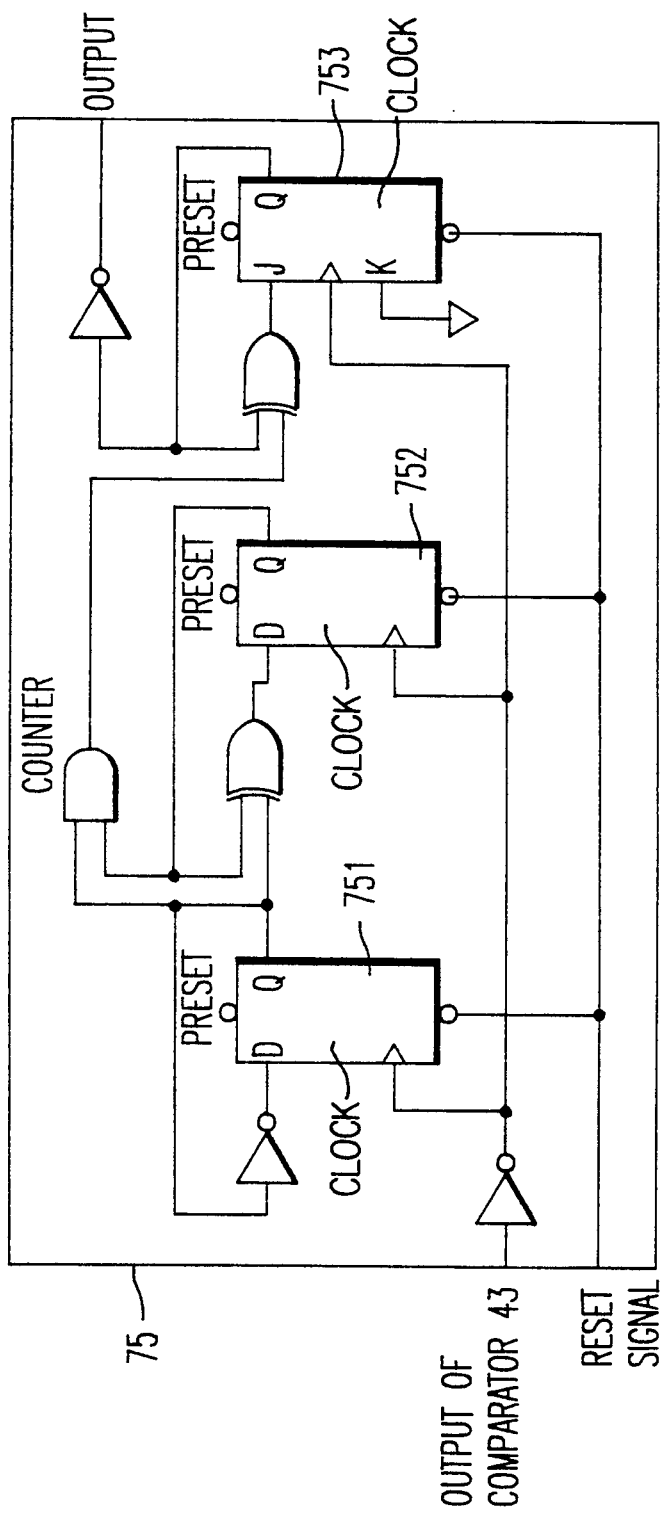
FIG. 4 is a diagram of another counter of the interface.

The output signal of comparator 43 is injected in a counter 75 illustrated in detail in FIG. 4.

This counter 75 is used to validate the normal state and to detect the defects not seen by counters 71 and 72 (for example, a short circuit between the two wires or a bus without communication).

This synchronous type counter consists of two D flip-flops 751 and 752 and one storage JK flip-flop 753, each receiving the output signal of comparator 43 on the "Clock" input.

The last stage consisting of a JK flip-flop 753 stores the passage of a predetermined number of transitions of the exiting signal of the comparator. By way of indication, this predetermined number is 4. The reinitialization of the counter is carried out only periodically by a monitoring signal coming from the clock circuit called "watchdog" and injected by the reset signal on the flip-flops.

The signal called "watchdog" is a train of periodic pulses.

During the course of the operation without anomaly, the stations must enter into communication at least once in the period of the signal called "watchdog." Therefore, in the period of the signal called "watchdog," it is verified that the output of counter 75 has indeed switched several times. The minimum number of switchings counted by 75 for a message on the bus is at least equal to the minimum number of transitions of a message screen.

The filling of counter 75 triggers a storage JK flip-flop 753 (level 1) otherwise the output level remains at 0 (initialization state). The output signal of flip-flop 753 is sent to a validation circuit 78 (AND gate) also receiving the signal of watchdog circuit 11. The "watchdog" pulse validates by validation circuit 78 the output signal of JK flip-flop 753 when it is opposite to it. A 0 on output 82 causes the normal mode, a 1 the degraded mode.

The "watchdog" pulse also actuates the resetting of counter 75 and reinitializes the output of flip-flop 753 once the validation is made.

The control circuit 8, illustrated in detail in FIG. 7, consists of an AND gate 81 which receives the output of a NOR gate having inputs thereto from counters 71 and 72 and the output of flip-flop 753.

Reinitialization circuit 79 makes it possible to obtain the reset signal for counter 75 and of reinitialization of JK flip-flop 753 from the "watchdog" in a manner similar to that of FIG. 5 but without inversion of the input signal. The output signal is inverted to create the validation control. A second inversion makes it possible to obtain the delayed reinitialization signal.

The output signals of storage flip-flops 91 and 92 of counters 71 and 72 are sent to a defect decoding circuit 93. This circuit 93 consists of 4 "NOR" circuits 931 of which one input is connected to output Q of a flip-flop 91 and of which the other input is connected to the other output of other flip-flop 91 or 92, as illustrated in FIG. 7.

The output state of the pair of flip-flops 91 or 92 is therefore decoded by the 4 "NORs" of the defect decoding circuit 93. The excitation of one of the outputs gives the type of the defect in progress:
defect on the DATA+wire,
defect on the DATA−wire,
short circuit or vacant bus.

| Flip-flop 91 | Flip-flop 92 | DEFECTS DECODED by the "NORs" |
|---|---|---|
| 0 | 1 | defect on the DATA + wire |
| 1 | 0 | defect on the DATA − wire |
| 0 | 0 | HS bus, inactive bus or short circuit |
| 0 | 0 | nominal state |

State 1-1 of two flip-flops 91 or 92 would indicate a succession of defects alternately on the wires of the bus—without passing through the normal state again. This case is transformed into a succession of states 0-1, 1-0 (or conversely) by resetting D flip-flop 91 or 92 opposite to the overflow counter.

The four "NORs" 931 of defect decoding circuit 93 decode the output state of storage flip-flops (91 or 92). Since the normal state and the short circuit are represented by the same pair of "bits" 0-0, the output of the "NORs" is to be validated by the "degraded mode" control (carried out simply by AND gates 932). A detected short circuit activates output 95 going to protocol manager 2.

In automatic control, the output of each AND gate 14 goes, through OR gates of the normal/degrade mode control circuit 10, to an input of an "AND" gate 131 whose other input receives the signal from a comparator 41, 42 either to validate or not the output of this gate 131. Selection circuit 13 receiving the signals of AND gates 14 and of the comparators makes it possible to communicate on a single wire either 11 or on 12 as a function of the detected defect.

The "normal mode" data coming from 15 inhibits the information coming from "NORs" 931, and validates the access to another "AND" 131 excited by comparator 43. The communications can thus be carried out normally on 11 and 12.

A single one of the 3 signals reaching ANDs 131 and 132 can be at 1 at a given moment, therefore a single comparator output is validated. An "OR" 133 makes it possible to come out only on one wire.

The choice between the manual operation or the automatic operation is made by a circuit 12 with 2 wires 122 and 123 to each of which is applied a logic level:
1-1: automatic,
0-0: manual with RO output of comparator 43,
0-1: manual with ERR1 output of comparator 41,
1-0: manual with ERR2 output of comparator 42.

The output combination of these wires is decoded by a unit 12 consisting of 4 "ANDs" 121. According to the pair of logic levels, a single output is at level 1, it validates the desired state (manual or automatic). In manual, the inhibition input of the outputs of the comparators is forced. In automatic, the control is performed according to the analysis of the circuitry.

FIG. 7 provides the achievement of the interface on a macrocomponent with 32 flip-flops.

Neither the analog filter nor the comparators are integrated.

One of the criteria for choosing the macrocomponent is its small space requirement. However, its use is not essential. In the latter case, the system can be improved by increasing the sampling rate in the digital filters and analyzed on a larger number of samples arriving at a decision on the switchings as a function of a certain percentage of 1 and 0.

We claim:

1. A line interface for a two wire bus, comprising:
a shaping circuit including three comparators, each comparator having two inputs and one output, the first comparator having the two inputs thereof connected to the two wires of the bus, the second comparator having the first input thereof connected to one of said bus wires and the second input thereof connected to a first reference signal, the third comparator having the first input thereof connected to the other of bus wires and the second input thereof connected to a second reference signal;
a first counter, connected to the output of the first comparator, for counting a number of transitions of the output of the first comparator during a period of time and generating on an output thereof, a defect signal if the counted number of transitions during the period of time is less than a predetermined number of transitions;
second and third counters respective to the second and third comparators, each of the second and third counters having an input connected to the output of the respective comparator and counting a number of times there exists a predetermined signal from the output of the comparator connected thereto, the second counter being reset through a reset input thereof connected to the output of the third comparator, and the third counter being reset through a reset input thereof connected to the output of the second comparator; and
bus defect determining means, connected to the outputs of the first, second, and third counters for determining a defect in the bus using the outputs of the first, second, and third counters.

2. A line interface for a two wire bus according to claim 1, further comprising:
a protocol manager for receiving a signal from the bus defect determining means which indicates a defect in the bus, and for controlling a protocol on the bus, depending on the signal from the bus defect determining means.

3. A line interface for a two wire bus according to claim 1, further comprising:
a protocol manager having an input connected to the defect signal generated by the first counter, the protocol manager changing a mode of operation of the bus when the defect signal of the first counter is detected.

4. A line interface for a two wire bus according to claim 1, further comprising:
a filter connected between the bus and the comparators, for converting analog signals on the bus to signals compatible with the inputs of the comparators.

5. A line interface for a two wire bus, according to claim 1, wherein the bus defect determining means comprises a defect decoding circuit, including: a plurality of NOR gates having inputs thereto connected the outputs of the second and third counters, the defect decoding circuit for indicating a type of defect on the bus.

6. A line interface for a two wire bus, according to claim 1, wherein the first counter further comprises:
a reinitialization input for resetting a number of transitions counted by the first counter after said time period of the first counter has passed.

7. A line interface for a two wire bus, according to claim 1, further comprising:
a selection circuit, connected to the bus defect determining means and the outputs of the second and third comparators, for enabling communication on only one of the two wires of the bus in response to an indicatons from the bus defect determining means that the other of said bus wires is defective.

8. A line interface for a two wire bus, according to claim 1, wherein the first and second reference signals are a same signal.

9. A line interface for a two wire bus, according to claim 1, further comprising:
a filter means, connected between the outputs of the second and third comparators and the inputs of the second and third counters, for preventing changes to the inputs of the second and third counters unless the outputs of the second and third comparators maintain the outputs thereof for a predetermined number of cycles.

10. A line interface for a two wire bus according to claim 9, wherein the filter means comprises sequential D flip-flops, a first D flip-flop having an input thereof connected to the output of one of the second and third comparators and an output thereof connected to an input of a subsequent D flip flop, each output of each D flip-flop connected to inputs of an AND gate and a NOR gate, outputs of the AND and NOR gates connected to inputs of a JK flip-flop, the JK flip-flow having an output connected to one of the second and third counters.

* * * * *